(12) United States Patent
Tinnin et al.

(10) Patent No.: US 11,753,064 B2
(45) Date of Patent: Sep. 12, 2023

(54) ENERGY ABSORBING APPARATUS

(71) Applicant: Steering Solutions IP Holding Corporation, Saginaw, MI (US)

(72) Inventors: Melvin L. Tinnin, Clio, MI (US); Joen C. Bodtker, Flint, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/555,214

(22) Filed: Dec. 17, 2021

(65) Prior Publication Data

US 2023/0192174 A1 Jun. 22, 2023

(51) Int. Cl.
B62D 1/19 (2006.01)

(52) U.S. Cl.
CPC ........................... B62D 1/19 (2013.01)

(58) Field of Classification Search
CPC .................. B62D 1/19; B62D 1/195
See application file for complete search history.

(56) References Cited

U.S. PATENT DOCUMENTS

| | | | | |
|---|---|---|---|---|
| 7,455,320 B2* | 11/2008 | Imamura | ................. | B62D 1/195 |
| | | | | 280/777 |
| 9,669,862 B1* | 6/2017 | Dubay | ................... | B62D 1/192 |
| 9,834,246 B1* | 12/2017 | Woycik | ................. | B62D 1/195 |
| 11,091,198 B2 | 8/2021 | Bodtker et al. | | |
| 2004/0217581 A1* | 11/2004 | Dubay | ................... | F16F 7/123 |
| | | | | 280/777 |
| 2006/0214411 A1* | 9/2006 | Ikegaya | ................... | B62D 1/19 |
| | | | | 74/492 |
| 2007/0228716 A1* | 10/2007 | Menjak | ................. | B62D 1/192 |
| | | | | 280/777 |
| 2014/0251059 A1* | 9/2014 | Russell | ................. | B62D 1/195 |
| | | | | 74/492 |
| 2015/0128752 A1* | 5/2015 | Buzzard | ................. | B62D 1/195 |
| | | | | 188/377 |
| 2016/0244015 A1* | 8/2016 | Dubay | ................... | B60R 21/02 |
| 2017/0259842 A1* | 9/2017 | Dubay | ................... | B62D 1/195 |
| 2018/0099687 A1* | 4/2018 | Stinebring | ............ | B62D 1/195 |
| 2018/0105196 A1* | 4/2018 | Bodtker | ................. | B62D 1/192 |
| 2018/0265116 A1* | 9/2018 | Sulser | .................... | B62D 1/195 |
| 2019/0100242 A1* | 4/2019 | Bodtker | ................. | B62D 1/195 |
| 2019/0100243 A1* | 4/2019 | Bodtker | ................. | B62D 1/195 |
| 2019/0135328 A1* | 5/2019 | Fricke | .................... | B62D 1/185 |
| 2019/0185046 A1* | 6/2019 | Reno | ..................... | B62D 1/195 |

(Continued)

FOREIGN PATENT DOCUMENTS

| | | | | |
|---|---|---|---|---|
| CN | 108238091 A | * | 7/2018 | ............. B62D 1/184 |
| CN | 112141203 A | * | 12/2020 | ............... B62D 1/16 |

(Continued)

*Primary Examiner* — James M Dolak
*Assistant Examiner* — Scott F. Underwood
(74) *Attorney, Agent, or Firm* — Dickinson Wright PLLC

(57) ABSTRACT

A steering column that includes a first jacket and a second jacket that is axially movable with respect to the first jacket. An energy absorbing apparatus is located between the first jacket and the second jacket. The energy absorbing apparatus includes a strap body that extends between a first end and a second end. A curved portion is located between the first end and the second end and a spring segment is configured to bias the curved portion towards the first end when the connector strap is fixed to a jacket of the steering column.

3 Claims, 9 Drawing Sheets

(56) References Cited

U.S. PATENT DOCUMENTS

| | | | |
|---|---|---|---|
| 2020/0398885 A1* | 12/2020 | Pichonnat | B62D 1/195 |
| 2021/0316779 A1* | 10/2021 | Dubay | B62D 1/184 |
| 2022/0126907 A1* | 4/2022 | Dubay | F16F 7/126 |
| 2022/0266890 A1* | 8/2022 | Buzzard | B62D 1/195 |

FOREIGN PATENT DOCUMENTS

| | | | | |
|---|---|---|---|---|
| DE | 102011083190 A1 | * | 3/2013 | B62D 1/181 |
| DE | 102017125959 A1 | * | 10/2018 | B62D 1/181 |
| FR | 2857323 A1 | * | 1/2005 | B62D 1/19 |
| KR | 19980032499 U | * | 9/1998 | |
| KR | 0139854 Y1 | * | 4/1999 | |
| KR | 20020015530 A | * | 2/2002 | |
| KR | 20060058962 A | * | 6/2006 | |

* cited by examiner

ENERGY ABSORBING APPARATUS

TECHNICAL FIELD

The following description relates to energy absorbing devices and, more particularly, to an energy absorbing apparatus for a steering column assembly.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column assembly for translating steering input to an output that interacts with a steering linkage to ultimately cause the vehicle wheels to turn. Regardless of the steering scheme, steering column assemblies include various safety features, such as airbags to lessen impact forces. In addition, many steering column assemblies are collapsible and include one or more energy absorption features, such as energy absorbing straps, that allow a certain amount of compression.

Some energy absorbing straps are configured to roll along their length to absorb energy, and are often referred to as roll straps. Typically, roll straps absorb energy during the deformation of the strap in an impact event wherein kinetic energy can be dissipated through compression of the steering column assembly. When designing an energy absorption strap, some principle considerations include load requirements, tunability, and packaging. Performance of the energy absorption strap in a collapse event has traditionally been influenced by many factors, including material thickness/width, material properties, and or shapes or features of the strap. As such, performance of the energy absorption strap can be changed on a vehicle-by-vehicle basis via a modification of these characteristics, but often packaging requirements limit the changes that can be made and can become quite complex to fulfill specific requirements during specific stages of the collapse cycle. For example, many pieces are required to connect a translating upper jacket to a jackscrew nut, requiring multiple assembly steps. The lower jacket is oftentimes also required to have large gaps to allow for strap travel, which requires added material to compensate for lost rigidity and strength. Space also oftentimes has to be made for a tail of the strap to feed out unimpeded to control the absorption load further creating packaging difficulties.

Accordingly, there is a continuing need to improve the operational framework of energy absorption features to improve upon packaging, load requirements, and tunability.

SUMMARY

This section provides a general summary of the disclosure and is not to be interpreted as a complete and comprehensive listing of all of the objects, aspects, features and advantages associated with the present disclosure.

An aspect of the disclosure includes an energy absorbing apparatus for a steering column. The energy absorbing apparatus comprises a strap body extending between a first end and a second end. A curved portion is located between the first end and the second end. A spring segment is configured to bias the curved portion towards the first end when the first end is fixed to a jacket of a steering column.

Another aspect of the disclosure includes an energy absorbing apparatus for a steering column. The energy absorbing apparatus comprises strap body extending between a first end and a second end. A curved portion is located between the first end and the second end and a connector strap is operably connected to the first end. The connector strap includes a spring segment configured to bias the curved portion towards the first end when the connector strap is fixed to a jacket of the steering column.

These and other aspects of the present disclosure are disclosed in the following detailed description of the arrangements, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column assembly for translating steering input to an output that interacts with a steering linkage to ultimately cause the vehicle wheels to turn. Regardless of the steering scheme, steering column assemblies include various safety features, such as airbags to lessen impact forces. In addition, many steering column assemblies are collapsible and include one or more energy absorption features, such as energy absorbing straps, that allow a certain amount of compression.

Figure 1:
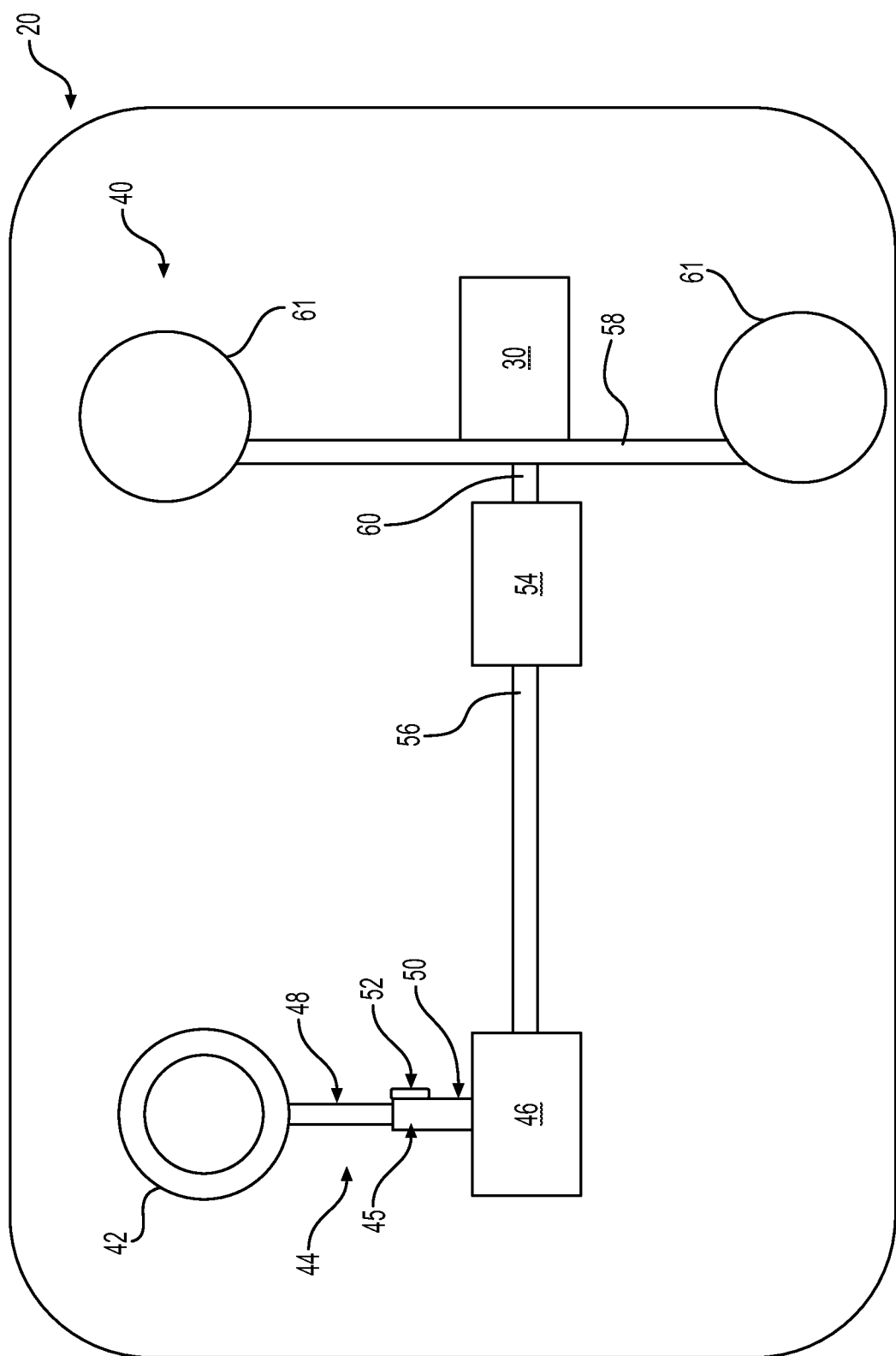
FIG. 1 generally illustrates a vehicle with a steering system according to the principles of the present disclosure.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an ignition system, an electronic system, or combinations thereof.

In some embodiments, the vehicle 20 may further include a steering system 40. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. A steering column assembly 44 may include a steering column 45 that extends along an axis from the input device 42 to an output assembly 46. The output assembly 46 may include a pinion shaft assembly, an I-shaft, a cardan joint, steer-by-wire components or any other features conventionally located opposite the input device 42.

The steering column 45 may include at least two axially adjustable portions, for example, a first jacket 48 and a second jacket 50 that are axially adjustable with respect to one another. The first jacket 48 may be an upper jacket and a second jacket 50 may be a lower jacket, wherein the first jacket 48 and the second jacket 50 are permitted to move axially with respect to one another during an impact or other compressive forces. The axial movement may include sliding, telescopic, translating, and other axial movements. The steering column assembly 44 may include additional portions that permit axial movement and brackets that provide rake and tilt movement. More particularly, the steering column assembly 44 may include a powered actuator (not shown) wherein the axial adjustments are machine driven.

An energy absorbing apparatus 52 may be located on one or each of the first jacket 48, the second jacket 50, or combinations thereof, and provide at least one of variable stroke load absorption settings and a steering column lock functionality. The energy absorbing apparatus 52 may dissipate kinetic energy between the first jacket 48 and the second jacket 50.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via a output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axle to turn the wheels 61.

Figure 2:
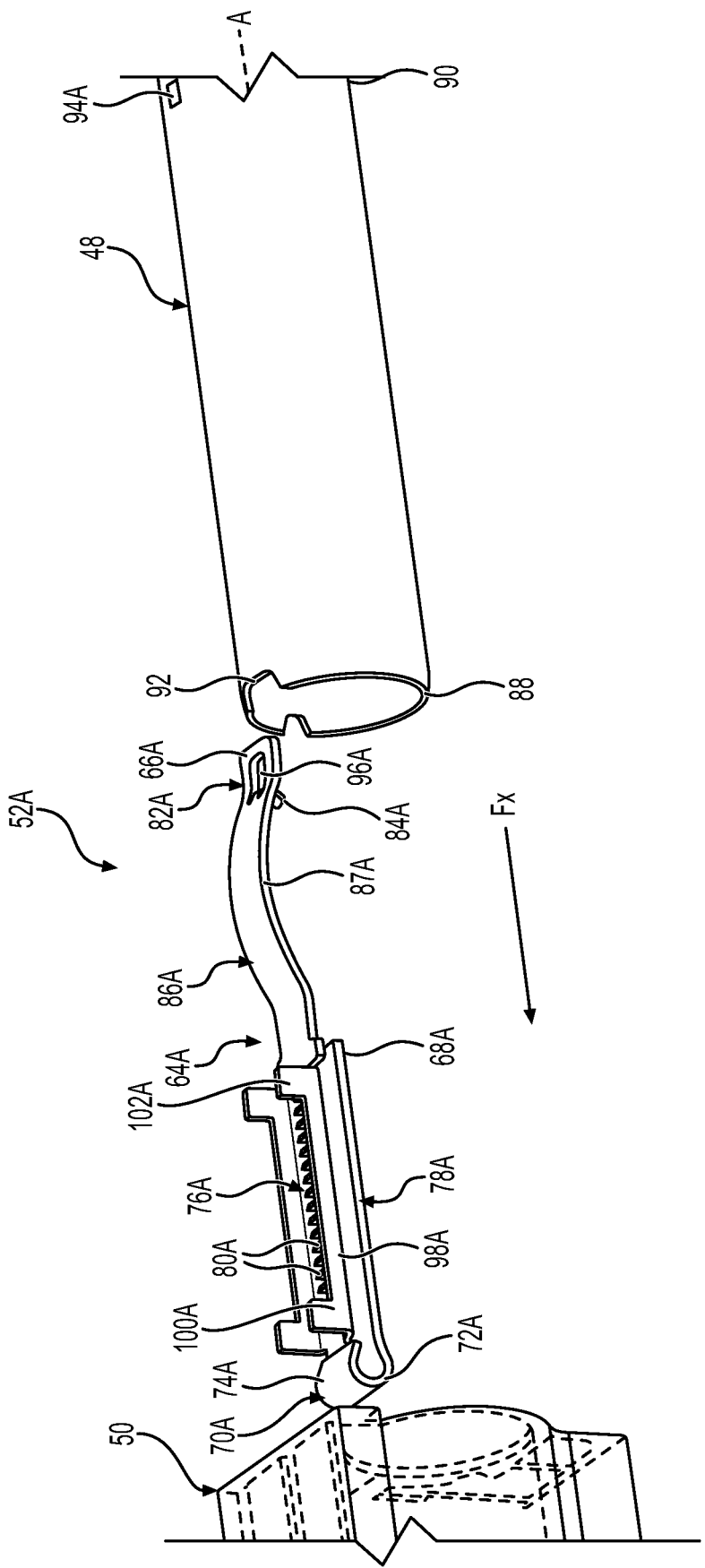
FIG. 2 generally illustrates an energy absorbing apparatus in accordance with a first arrangement including a strap body having a bowed portion.

FIG. 2 illustrates the energy absorbing apparatus 52A in accordance with a first arrangement. The energy absorbing apparatus 52A may be connected to the first jacket 48 (upper jacket), the second jacket 50 (lower jacket), or a combination thereof. In some embodiments, the energy absorption apparatus 52A includes an energy absorbing roll strap body 64A that is at least partially coupled between the first jacket 48 and the second jacket 50. During a collapse event, a force 'Fx' may move or collapse the first jacket 48 relative to the second jacket 50 along an axis A, and the energy absorbing apparatus 52A dissipates at least some of the kinetic energy of collapsing first jacket 48 and the second jacket 50.

With continued reference to FIG. 2, in some embodiments, the energy absorbing roll strap body 64A may include a first end 66A and a second end 68A spaced from the first end 66A by an intermediate portion 70A. The intermediate portion 70A includes a curved portion 72A. The curved portion 72A may facilitate "rolling" of strap body 64A during a collapse event as first end 66A or second end 68A moves in the direction of force 'Fx'. The intermediate portion 70A may include an initial collapse or roll area 74A is located between a first segment 76A that extends from the first end 66A to the intermediate portion 70A and a second segment 78A that extends from the second end 68A to the intermediate portion 70A. The initial collapse area 74A represents the starting roll or deformation location where the "roll" or deformation of strap body 64A begins during a collapse event. The first segment 76A or the second segment 78A includes a series of teeth 80A extending therefrom. In some embodiments, the first end 66A defines a connector 82A including a spring finger 84A projecting towards the axis A. A spring segment 86A may be located between the first end 66A and the first segment 76A. When the connector 82A is engaged the first jacket 48 or the second jacket 50, the spring segment 86A may bias the first end 66A towards the intermediate portion 70A. As illustrated, the spring segment 86A may include an outwardly bowed portion 87A.

Figure 3:
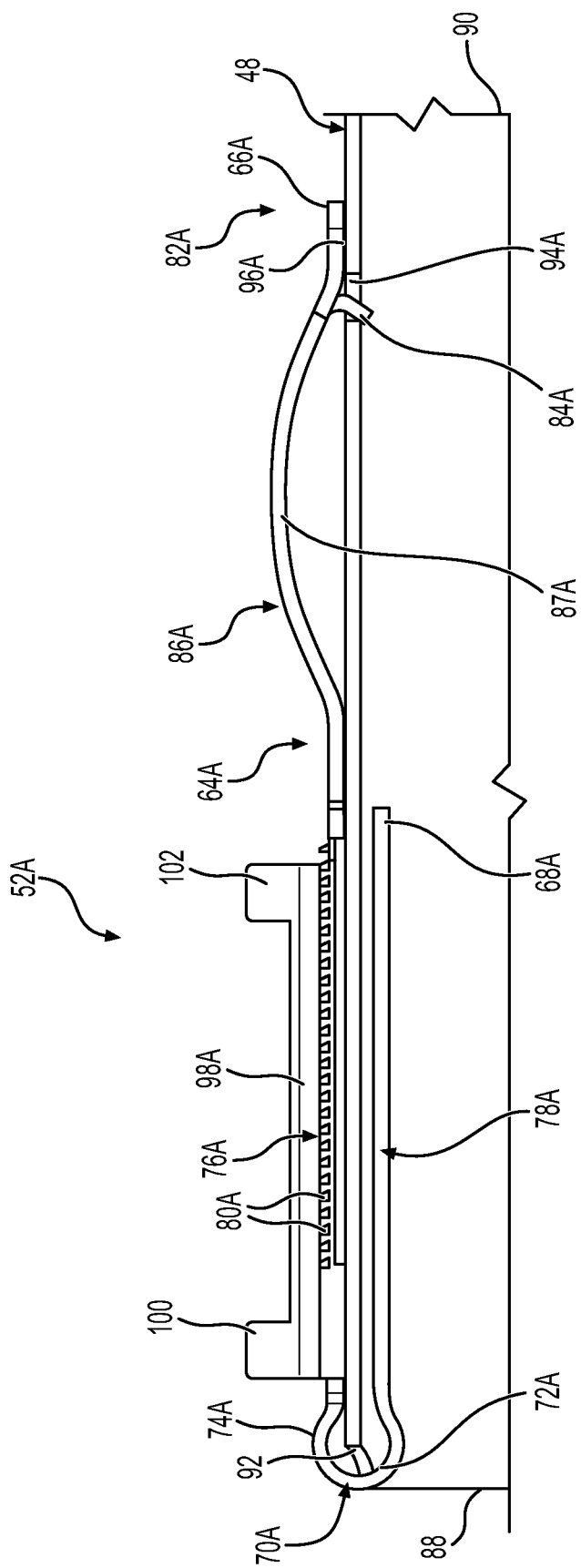
FIG. 3 generally illustrates a cross-sectional view of the first arrangement of energy absorbing apparatus.

As best illustrated in FIGS. 2 and 3, in some embodiments, the roll strap body 64 may connected directly to the first jacket 48, which may be an upper, inner jacket. The first jacket 48 may extend between a lower end 88 that is inserted into the second jacket 50 and an upper end 90 that is opposite of the lower end 88. The lower end 88 may include a notch 92 sized to insert the curved portion 72 and an aperture 94A spaced between the lower end 88 and the upper end 90 for placing the connector 82A. Therefore, the roll strap body 64 may be connected to the first jacket 48 without any fasteners. As best illustrated in FIG. 3, the spring finger 84A is located in the aperture 94A and the bowed portion 87A biases the first end 66A away from the curved portion 72A such that the curved portion 72A is drawn within the notch 92 in a direction towards the first end 66A. During assembly, the bowed portion 87A can be pressed downwardly, extending the bowed portion 87A along the axis A, until the spring finger 84A is aligned with the aperture 94A. In some embodiments, the connector 82A includes an opening 96A and the spring finger 84A is located at least partially in the opening 96A whereat it extends towards the axis A. During assembly, the spring finger 84A may shaped (e.g. stamped or otherwise deformed) from the first end 66A to form the opening 96A.

In some embodiments, a pair of sidewalls 98A may extend along the first segment 76A on opposite sides of the teeth 80A. Each sidewall 98A may extend between a lower stop tab 100A and an upper stop tab 102A. In use, the lower stop tab 100 may contact a portion of an energy absorbing actuator (e.g. a lock cam and/or the like) and create a hard stop in a first direction and the upper stop tab 102A may contact a portion of the energy absorbing actuator and create a hard stop in a second direction.

Figure 4:
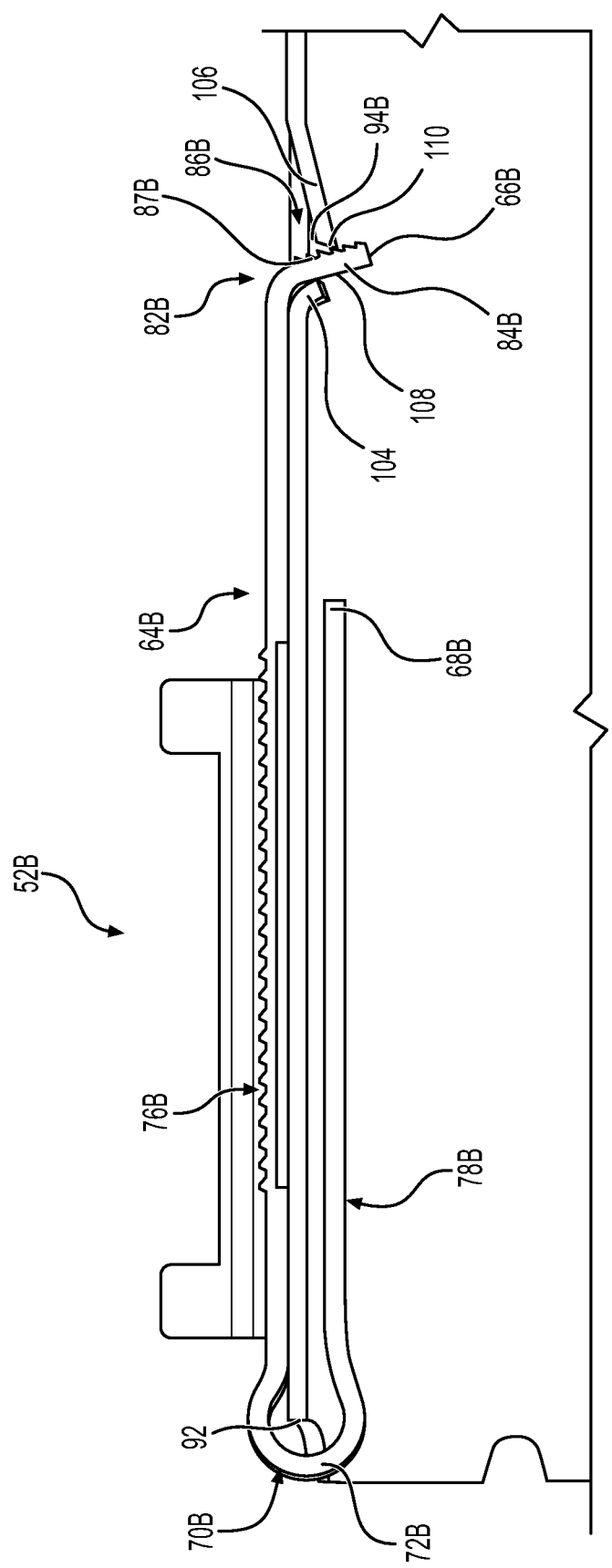
FIG. 4 generally illustrates an energy absorbing apparatus in accordance with a second arrangement including a strap body having a series of clinch teeth.

With reference now to FIG. 4, the energy absorbing apparatus 52B is illustrated in accordance with a second arrangement. The energy absorbing apparatus 52B may include all the same features, constructions, and materials as described in the other arrangements herein. However, the energy absorbing apparatus 52B may include a modified connector 82B and spring segment 86B and the first jacket 48 may include a modified aperture 94B. More particularly, the connector 82B is engaged the aperture 94B in the first jacket 48. The connector 82B includes a spring segment 86B that includes a spring finger 84B and a series of clinch teeth 87B. The spring finger 84B extends from a first segment 76B in a direction towards the axis A and away from an intermediate portion 70B to a first end 66B.

The aperture 94B is defined by a first lip 104 extending from an outer edge of the aperture 94B and a second lip 106 extending from an opposite outer edge of the aperture 94B. In some embodiments, the first lip 104 may be on an outer edge closest to the intermediate portion 70B and define a curved or angled surface for interfacing with a bottom surface 108 (e.g. opposite the clinch teeth 87B) of the spring finger 84B. The second lip 106 may be on an outer edge furthest from the intermediate portion 70B and define a detent edge 110 for interfacing with the clinch teeth 87B. During assembly, the spring finger 84B can be pressed downwardly into the aperture 94B until the clinch teeth 87B on the spring finger 84B interface with the detent edge 110. The spring finger 84B can be pressed further into the aperture to lock the detent edge 110 with sequential clinch teeth 87B to compensate for a variety of tolerances thus permitting multiple settings for different jacket sizes and configurations. The spring finger 84B is biased into the first jacket 48 and thus biases the first end 66B towards the curved portion 72B, drawing the curved portion 72B into the notch 92.

Figure 5:
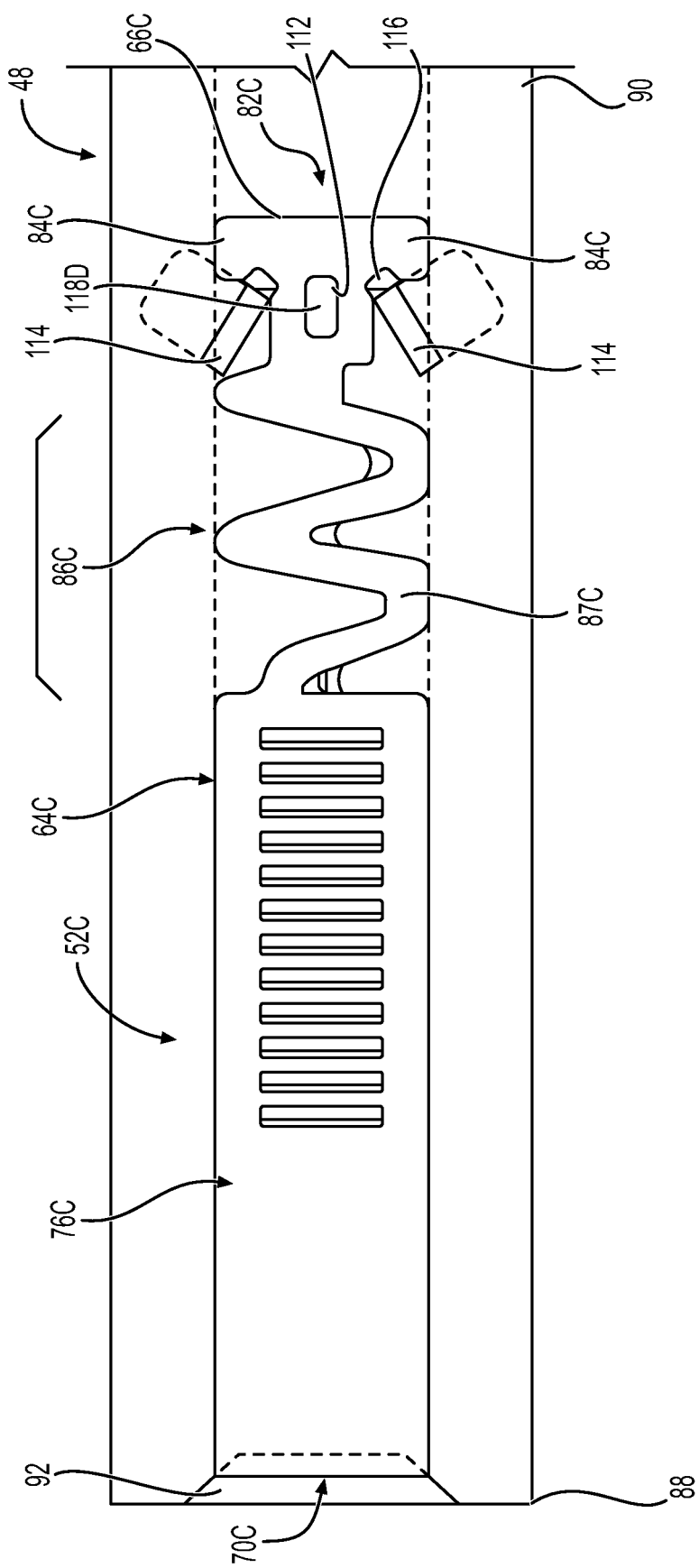
FIG. 5 generally illustrates an energy absorbing apparatus in accordance with a third arrangement including a strap body having a series of formed waves.

With reference now to FIG. 5, the energy absorbing apparatus 52C is illustrated in accordance with a third arrangement. The energy absorbing apparatus 52C may include all the same features, constructions, and materials as described in the other arrangements herein. However, the energy absorbing apparatus 52C may include a modified connector 82C and spring segment 86C and the first jacket 48 may be modified. More particularly, the spring segment 86C may include at least one wave 87C (e.g. a plurality of waves 87C). The at least one wave 87C may be sinusoidal, square, triangular, serpentine, the like, and/or combinations thereof. As illustrated, the at least one wave 87C includes a plurality of waves 87C that extend from the first segment 76C to the connector 82C. In some embodiments, the connector 82C includes at least one retaining finger 84C (e.g. a pair of retaining fingers 84C) extending in opposite directions and an opening 112 located between the retaining fingers 84C.

The first jacket 48 may include a pair of collar tabs 114 that extend in intersecting directions towards the retaining fingers 84C. Each retaining finger 84C may include a groove 116 for locating an edge of the collar tabs 114 therein. The first jacket 48 may further include a jacket opening 118D, which may be slightly offset from the opening 112. During assembly, the spring segment 86C may be elongated until the retaining fingers 84C can be connected to the collar tabs 114, a prybar can be inserted through the opening 112 and into the jacket opening 118D to extend the spring segment 86C and locate the retainer fingers 84C for connection. The waves 87C thus bias the first end 66C towards the intermediate portion 70C, drawing a curve portion 72C into the notch 92.

Figure 6:
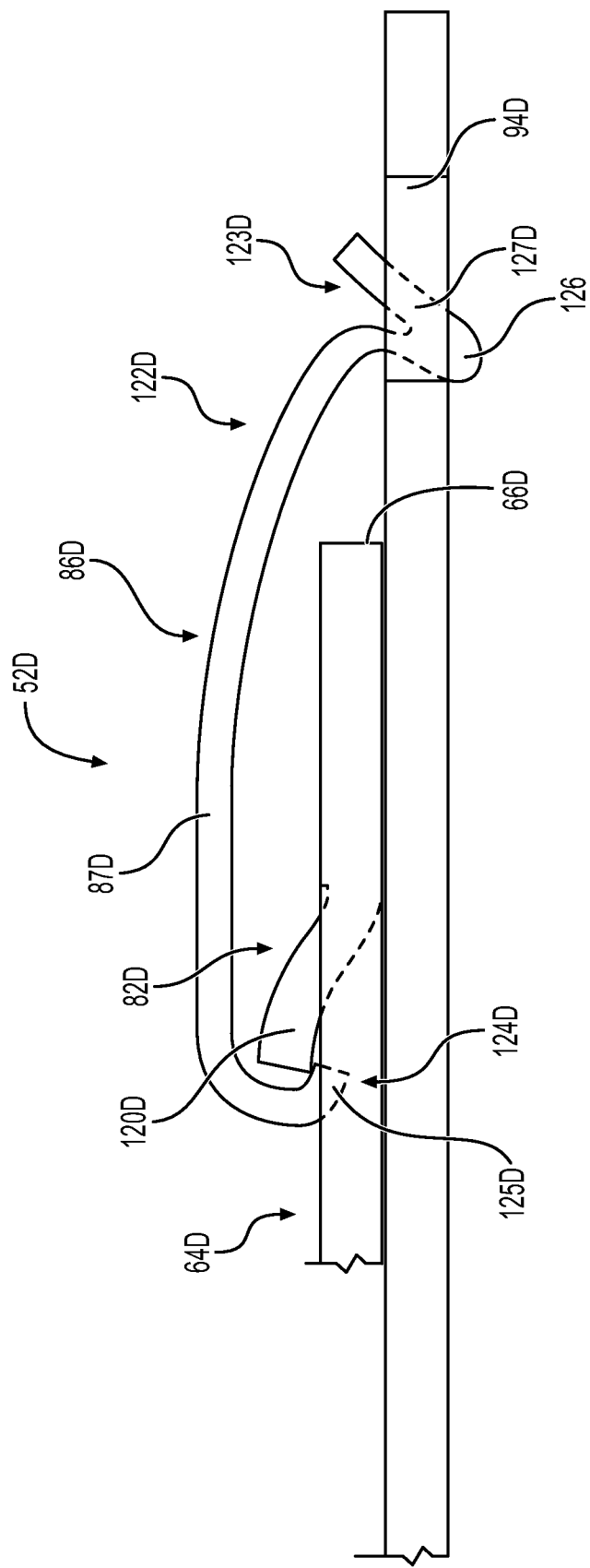
FIG. 6 generally illustrates an energy absorbing apparatus in accordance with a fourth arrangement including a strap body and a connector strap having a bowed portion.

With reference now to FIG. 6, the energy absorbing apparatus 52D is illustrated in accordance with a fourth arrangement. The energy absorbing apparatus 52D may include all the same features, constructions, and materials as described in the other arrangements herein. However, the energy absorbing apparatus 52D may include a modified strap body 64D. The strap body 64D may include a first end 66D and a second end (not shown) spaced from the first end 66D. The strap body 64D may include a connector 82D that defines a first projection 120D extending outwardly therefrom. A connector strap 122D may extend between a first strap connecter 123D and a second strap connector 124D. The first strap connecter 123D may include a connector finger 127D. The first jacket 48 may define an aperture 94D. The connector strap 122D may include a spring segment 86D extending between the first strap connecter 123 and the second strap connector 124D. The spring segment 86D may define a bowed portion 87D.

During assembly, the second strap connector 124D may include a hook 125D latched onto the first projection 120D and the bowed portion 87D can be stretched (e.g. pressed downwardly), extending the bowed portion 87D along the axis A, until the connector finger 127D is aligned with an aperture 94D in the first jacket 48 and inserted therein. The connector finger 127D may include a bend 126 and the bend 126 may interface with an outer edge of the aperture 94D. When engaged, the bowed portion 87D biases the first end 66D towards an intermediate portion, drawing a curved portion into the notch 94 (not shown).

Figure 7:
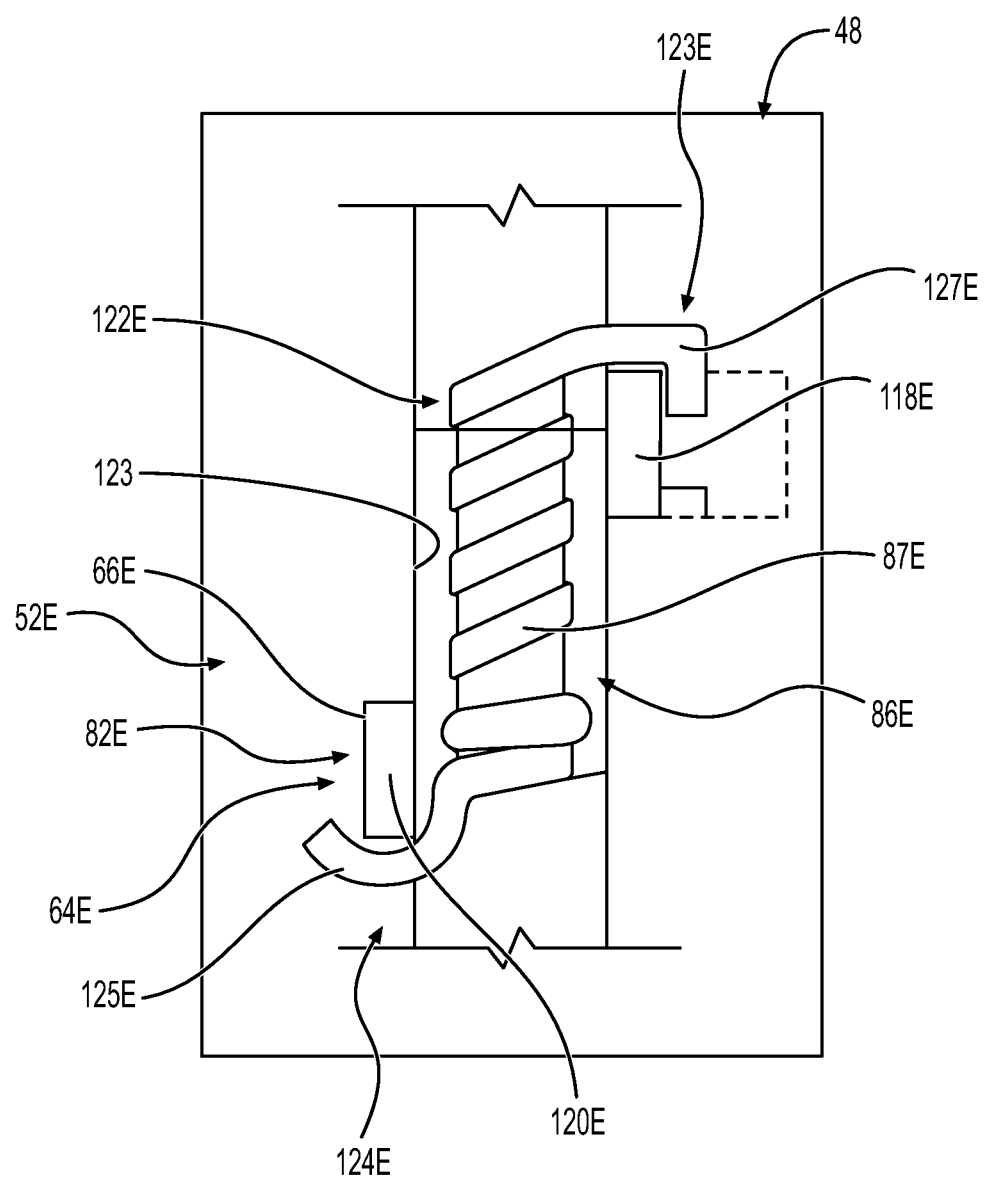
FIG. 7 generally illustrates an energy absorbing apparatus in accordance with a fifth arrangement including a strap body and a connector strap having a helical spring.

With reference now to FIG. 7, the energy absorbing apparatus 52E is illustrated in accordance with a fifth arrangement. The energy absorbing apparatus 52E may include all the same features, constructions, and materials as described in the other arrangements herein. However, the energy absorbing apparatus 52E may include a modified connector strap 122E. More particularly, the strap body 64E may include a first end 66E and a second end (not shown) spaced from the first end 66E. The strap body 64E may include a connector 82E that defines a first projection 120E extending in a direction away from the axis A. A connector strap 122E may extend between a first strap connecter 123E and a second strap connector 124E. The first connector 123E and the second strap connector 124E may both include a hook (125E, 127E). The first jacket 48 may define a projection 118E. The connector strap 122E may include a spring segment 86E extending between the first strap connector 123E and the second strap connector 124E. The spring segment 86E may define a helically-shaped spring 87E. In some embodiments, the helically-shaped spring 87E may be at least partially located within a window 123 defined by the first jacket 48.

During assembly, the second connector 124E may be latched onto the first projection 120E and the helically-shaped spring 87E can be extended along the axis A until the first connector 123E is aligned with the projection 118E on the first jacket 48. When engaged, the helically-shaped spring 87E biases the first end 66E towards an intermediate portion, drawing a curved portion into the notch 94 (not shown).

Figure 8:
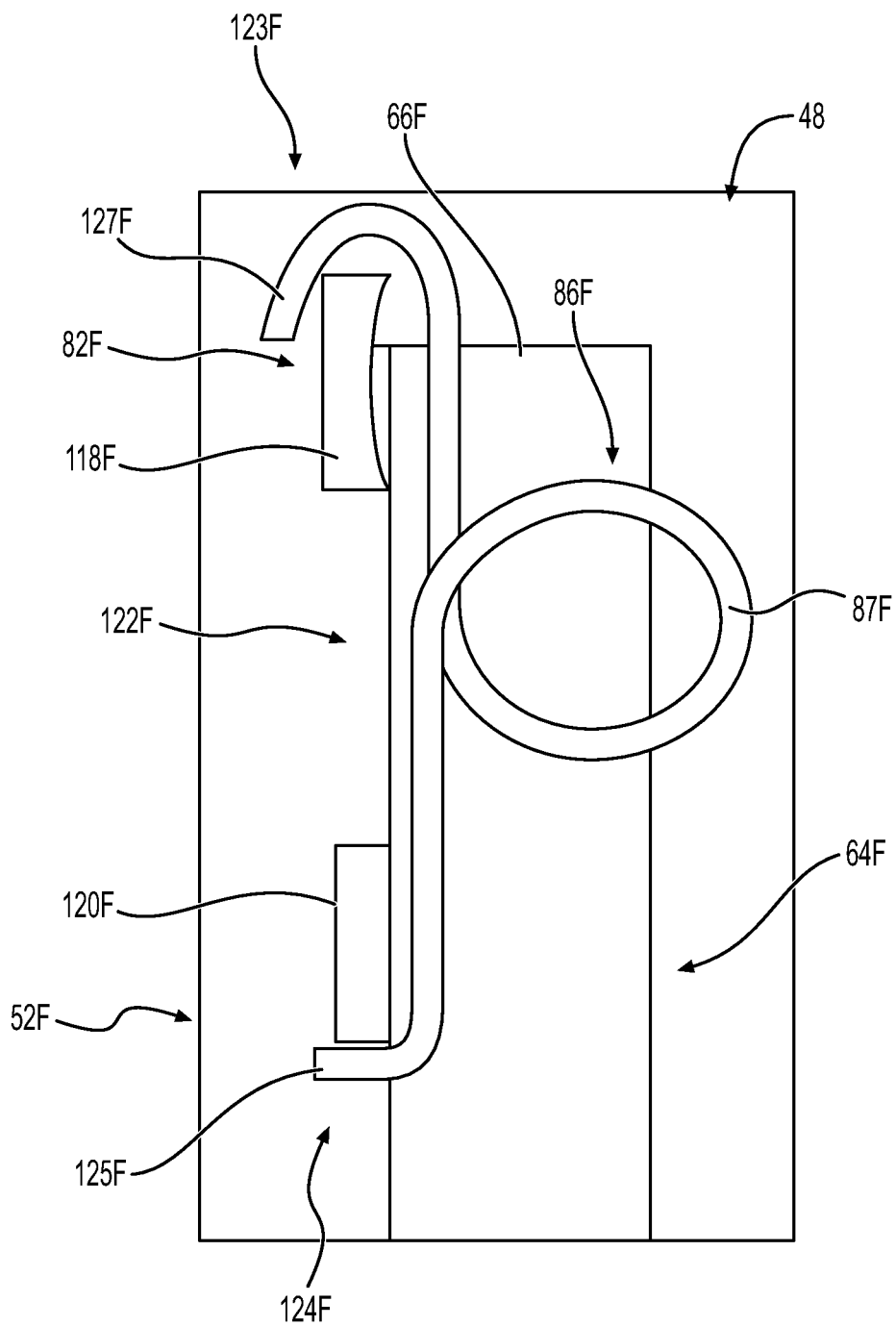
FIG. 8 generally illustrates an energy absorbing apparatus in accordance with a sixth arrangement including a strap body and a connector strap having a torsion spring.

With reference now to FIG. 8, the energy absorbing apparatus 52F is illustrated in accordance with a sixth arrangement. The energy absorbing apparatus 52F may include all the same features, constructions, and materials as described in the other arrangements herein. However, the energy absorbing apparatus 52F may include a modified connector strap 122F. More particularly, the connector strap 122F may include a spring segment 86F extending between a first strap connecter 123F and a second strap connector 124F. The first strap connector 123F and the second strap connector 124F may both include a hook (125F, 127F). The spring segment 86F may define a torsion spring 87F.

During assembly, the second connector 124F may be latched onto a connector 82F (e.g. a first projection 120F) on the strap body 64F and the torsion spring 87F can be extended along the axis A until the first connector 123F is aligned with a projection 118F of the first jacket 48. When engaged, the torsion spring 87F biases a first end 66F of the strap body 64F towards an intermediate portion, drawing a curved portion into the notch 94 (not shown). The torsion spring 87F may be located on an exterior of the first jacket 48 or within an interior of the first jacket 48 through a window (not shown).

Figure 9:
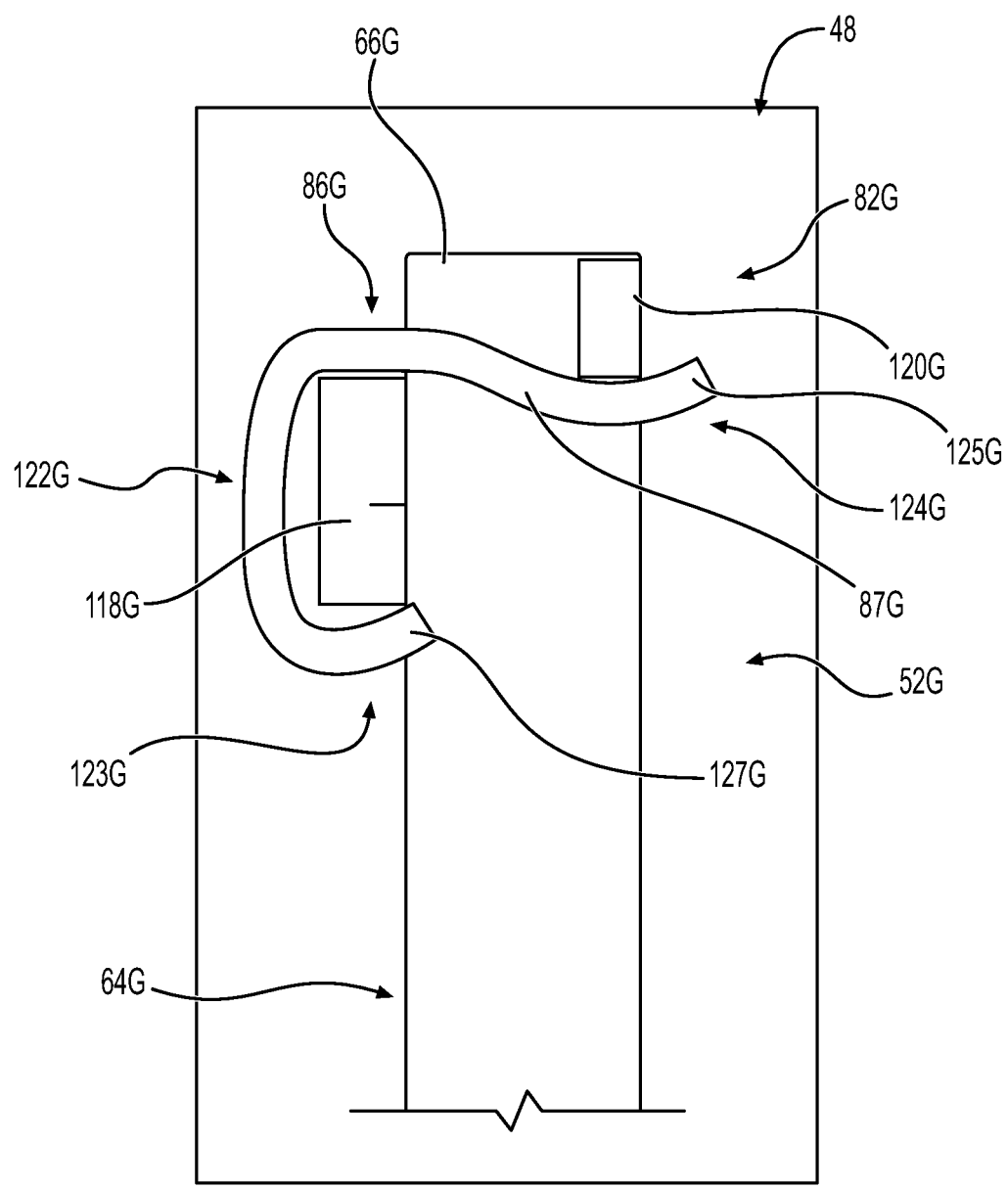
FIG. 9 generally illustrates an energy absorbing apparatus in accordance with a seventh arrangement including a strap body and a connector strap having a wire spring.

With reference now to FIG. 9, the energy absorbing apparatus 52G is illustrated in accordance with a seventh arrangement. The energy absorbing apparatus 52G may include all the same features, constructions, and materials as described in the other arrangements herein. However, the energy absorbing apparatus 52G may include a modified connector strap 122G. More particularly, the connector strap 122G may include a spring segment 86G extending between a first strap connecter 123G and a second strap connector 124G. The first connector 123G and the second strap connector 124G may both include a hook (125G, 127G). The spring segment 86G may define a wire spring 87G.

During assembly, the second strap connector 124G may be latched onto connector 82G (e.g. a first projection 120G) on the strap body 64G and the wire spring 87G can be extended along the axis A (e.g. rotated along the axis A until the hook 127G catches the first projection 118G) until the first strap attachment 123G is aligned with a first projection 118G of the first jacket 48. When engaged, the wire spring 87G biases a first end 66G of the strap body 64G towards an intermediate portion, drawing a curved portion into the notch 94 (not shown).

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. An energy absorbing apparatus for a steering column comprising:
   a strap body extending between a first end and a second end;
   a curved portion located between the first end and the second end; and
   a spring segment configured to bias the curved portion towards the first end when the first end is fixed to a jacket of the steering column, wherein the spring segment includes a bowed portion located between the first end and the curved portion, wherein the first end includes a connector for connecting to the jacket, wherein the connector includes at least one of a spring finger and a retaining finger.

2. The energy absorbing apparatus of claim 1, wherein a first segment extends between the curved portion and the first end and the first segment defines a plurality of teeth.

3. The energy absorbing apparatus of claim 2, wherein the bowed portion is located between the first segment and the first end.

* * * * *